United States Patent [19]
Johansson

[11] 3,948,403
[45] Apr. 6, 1976

[54] DEVICE ADAPTED TO FACILITATE THE SIMULTANEOUS TRANSPORTATION OF A NUMBER OF STANDARDIZED LOAD UNITS

[75] Inventor: Anders Johansson, Bohus Bjorko, Sweden

[73] Assignee: Salen Interdevelop AB, Sundbyberg, Sweden

[22] Filed: Jan. 27, 1975

[21] Appl. No.: 544,580

[30] Foreign Application Priority Data
Jan. 31, 1974 Sweden............................. 7401232

[52] U.S. Cl.................. 214/512; 214/515; 254/2 R
[51] Int. Cl.² ........................................... B60P 1/02
[58] Field of Search................... 214/512, 515, 621; 254/2 R, 2 B, 2 C, 93 R

[56] References Cited
UNITED STATES PATENTS
2,048,580 7/1936 Webber.......................... 214/515 X
3,010,698 11/1961 Allen et al. ......................... 254/2 R Primary Examiner—Robert G. Sheridan
Attorney, Agent, or Firm—Holman & Stern

[57] ABSTRACT

Containers and similar standardized load units mean a considerable saving in the manual work implied in loading and unloading of a ship. The time a ship stays in harbour is a loss, from the transportation point of view, and should be shortened as much as possible. That could be attained if the containers could be grouped together in prearranged compounds.

The invention presupposes a beam frame support for such a compound as well as a trolley member adapted to move said support. The latter, which must follow the ship on its journey, must be very low, so as not to steal valuable space on board the ship and the trolley member must be able to fit into this low support.

9 Claims, 10 Drawing Figures

DEVICE ADAPTED TO FACILITATE THE SIMULTANEOUS TRANSPORTATION OF A NUMBER OF STANDARDIZED LOAD UNITS

BACKGROUND OF THE INVENTION

Such goods as are to be transported in ships are nowadays often brought together into standardized load units, usually so called containers, but may also be loaded onto flats having the same base measures as containers and being provided with corner stanchions or foldable gables having a height corresponding to that of a container. The dimensions of a container are standardized internationally, and the use of such units make possible a rapid and rational handling of the cargo. Certain goods, for instance boards and sawn timber may be bundled together to form a unit having the same dimensions as a container, and the expression, standardized load unit, which is used in this specification and the pertaining claims, shall be understood to include also such units, which have the proper dimensions and in which the goods forming the unit are sufficient strong and rigid to permit the handling in the same manner as a container or a flat. Certain moments for instance when loading or unloading a ship, could however be further simplified if several load units could be transported simultaneously.

With ships of the "Ro-Ro" type, namely of the roll-on roll-off type as distinguished from ships handling the units by cranes, etc., fork lift trucks are often used, which have a capacity to lift one, possibly two containers, one on top of the other, for each trip into, or out of the ship. Further advantages could be obtained if a number of standardized load units could be combined to a transportation compound, which by means of a suitable trolley member could be moved into or out of the ship, respectively. In such a manner it would be possible already at the harbour to prepare the cargo into a restricted number of transportation compounds, which could rapidly be brought on board as soon as the corresponding number of compounds had be unloaded.

A container is provided with a built-in box at each of its eight corners for the application of lifting and locking means and furthermore along its lower longitudinal sides with pockets for the fork of the truck. A container is sufficiently rigid to be self supporting between the lower corner boxes. These are, however, so low that it is impossible to use other wheeled lifting means than fork lift trucks, and for practical reasons it is not possible to make the forks so long that two containers, arranged side by side, could be lifted.

SUMMARY OF THE INVENTION

According to the invention a suitable number of standardized load units are combined upon a carrying support into a transportation commpound, said support having a sufficient height to permit the introduction thereinto of a trolley fitted for this purpose and adapted to lift and to move the support with the load resting thereon. The invention is characterized in a beam frame of rectangular configuration, the breadth and length thereof substantially corresponding to whole multiples of the breadth and the length of a standardized load unit, and which is open at least along one of its sides, the beams forming the sides of the frame being arranged in such a manner that they will form a channel at least along two parallel sides of the frame, said channel being open inwards with respect to the frame, the trolley being arranged to engage the frame at the channels and to lift directly at the frame.

A beam frame is in its simplest shape formed like a U, but frames may be combined within a compound support to form a H or an E.

According to an advantageous embodiment of the invention beams forming the sides of the frame are arranged in such a manner that they will form a channel, at least along two parallel sides of the frame, said channel being open inwards with respect to the frame. A necessary function of the frame is to locate the lowermost units a sufficient distance above floor level to permit the trolley to be introduced below the containers. As these are very rigid it is possible to lift directly at the containers if these are securely locked to the frame.

The sides of the beam frame being perpendicular with respect to the open side will herebelow be termed longitudinal sides. The breadth of a simple frame, or a part of a combined frame is thus substantially the same as the length or the breadth, respectively, of a standardized load unit, while the length is a whole multiple of the length or breadth, respectively, of such a unit, depending upon the units being arranged parallel to, or perpendicularly to the longitudinal sides of the frame. It is evident that the dimensions of the frame shall be sufficient to permit accessibility for lashing the units to the frame and the latter to the ship's deck, respectively.

Furthermore, it is necessary to take into account that the frame, while being moved over a ground which is not fully level, will be subjected to bending forces. The units should therefore not be located close by each other in the longitudinal direction of the frame, but ought to be separated by a distance of about 5 cm. If the middle portion of the frame sags the adjacent top edges of the uppermost units should not touch and thereby prevent the deformation movements of the frame.

As the space within the ship permits, two or more units may be arrranged on top of each other.

DESCRIPTION OF SOME PREFERRED EMBODIMENTS

Figure 1:
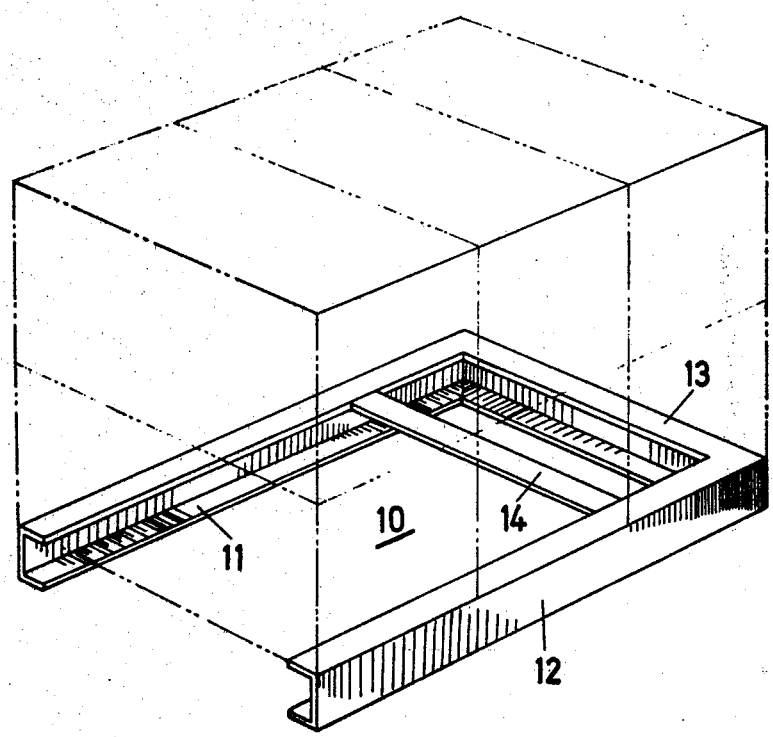
FIG. 1 shows a perspective view of a beam frame.

The beam frame 10 shown in FIG. 1 is composed of two parallel side beams 11 and 12 and a transverse beam 13. These have, in this very schematic embodiment, a U-shaped cross section, the channels being turned with their open sides inwards with respect to the frame. In this manner a groove is formed along three sides of the frame into which it is possible to slide a trolley shaped as a low flat unit.

The frame has a breadth which, taking the above mentioned margins for lashing and deformation into account, corresponds to the length of a load unit, and it has in the present embodiment a length corresponding to the breadth of three units. It is on these occasions strong enough to carry two layers of load units. FIG. 1 shows in dashed lined six load units, being common containers.

As the fourth side of the frame is open it is possible to drive a fork lift truck into the frame and to deposit a first load unit, or a pair of such units, at the closed end of the frame. The truck will never move closer to the transverse beam 13 than the breadth of a load unit, and the frame may therefore, at a distance from the transverse beam corresponding to this measure, be provided with a cross brace 14. This should, however, not be so deep as to prevent the introduction of the trolley.

Figure 2:
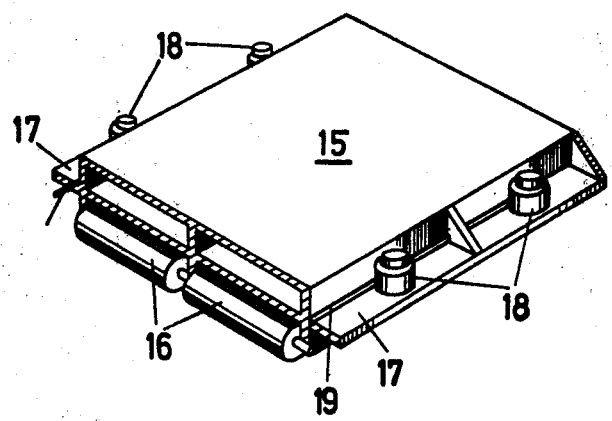
FIG. 2 shows, likewise in perspective, a portion of a trolley.

A portion of a trolley is schematically shown in FIG. 2. It is evident that the trolley shall have the same length as the beam frame and of course it shall have a sufficient breadth to make it fit into the beam channels, and furthermore it shall be provided with means for connection to a traction vehicle.

The lower containers rest with their corner boxes upon the beam frame, which means that the beams are subjected to point loads. Presupposing that the frame is lifted vertically upwards at the beams it is not necessary to calculate with any transverse bending strength of the frame.

The trolley has two functions, on the first hand it shall lift the complete load compound and on the other hand it shall permit a movement in the horizontal plane. The latter function may be taken care of by means of wheels or rollers, but for moving heavy or big compounds an air cushion device is preferred. This will at the same time perform the lifting function.

The trolley 15 schematically shown in FIG. 2 includes a central flat body, which is carried by a number of rollers 16. Along each longitudinal edge the central body is provided with a flange or ledge 17, upon which a number of pressure fluid rams 18 are mounted. A pressure fluid is, in known manner, supplied and withdrawn, respectively, through pipes 19.

The arrangement shown is very schematic and the intention is to show how the rams 18 are located, so they, when the trolley is slid into the frame, will be positioned below the corner boxes, i.e. where the point loads act. A development would include a beam, resting upon the rams and adapted to engage the lower face of the top flange of the beam.

Figure 3:
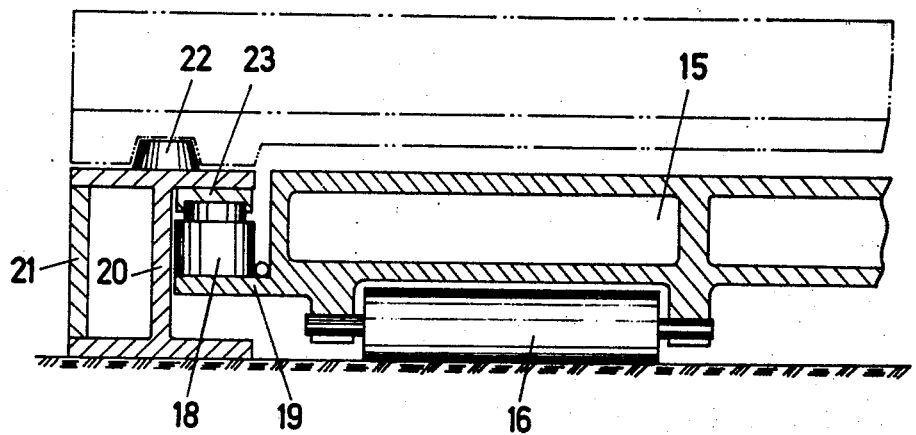
FIG. 3 shows, on a somewhat larger scale, a modified embodiment where the trolley is fitted within the frame.

FIG. 3 shows a modified embodiment. The beam frame is composed of I-beams 20, which outwardly are strengthened by flat bars 21 welded between the flanges of the beam. A compound consisting of six load units has a considerable weight, and it is necessary to select the beams in such a manner that their lower flanges will obtain a satisfactory area, so the ground support is not damaged. The top faces of the longitudinal side beams 20 are provided with extending spigots 22, which fit into the corner boxes and will lock the same with respect to the beams.

The trolley is, as in FIG. 2, supported by rollers 16 and a number of rams 18 are mounted on shelves 19 along the longitudinal sides of the central body. The rams are here interconnected by a beam 23, which engages the top flange of the beam.

Figure 4:
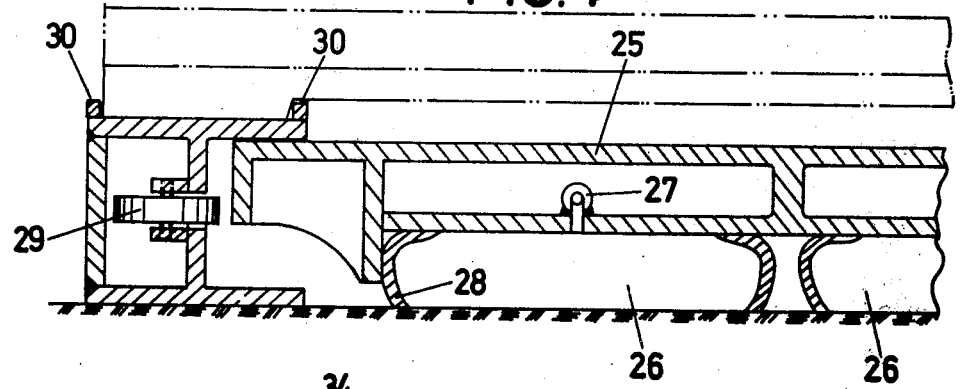
FIG. 4 shows a picture corresponding to that of FIG. 3, where the lifting and movement facilitating parts of the trolley are formed as air cushions.

With the embodiment shown in FIG. 4 the trolley includes a platform 25, which is carried by a number of air cushions 26 supplied with working fluid through conduits 27.

Air cushion devices are well known in the art in a number of designs and shapes, and form, by themselves, no basic part of the invention. In order to obtain a satisfactory stability and the necessary carrying capacity also if some of the cushions should be deficient it is advantageous to arrange the cushions in two or more rows. By making the mounting of the individual cushions to the platform flexible it is possible to move big frames from a plane quay to a plane deck across an inclined ramp.

The cushions are shown as defined by resilient membranes 28, but it is evident that instead separately, inflatable, open or closed annular elements of elastic material may be used. These elements will then take care of the lifting function, while air introduced within the annular elements will make the sideward movement possible.

The side beams 20 are provided with guides 29 in the form of rollers for facilitating the introduction of the trolley. Instead of spigots 22 the beams are here provided with brackets 30, intermediate which the corner boxes may be fitted.

The air cushions will here perform lifting of the beam frame with its load and will also permit the movement along the ground. The air is supplied through hoses from an existing air distribution system, or from a compressor mounted upon an extension of the trolley, or upon the traction vehicle, respectively.

Figure 5:
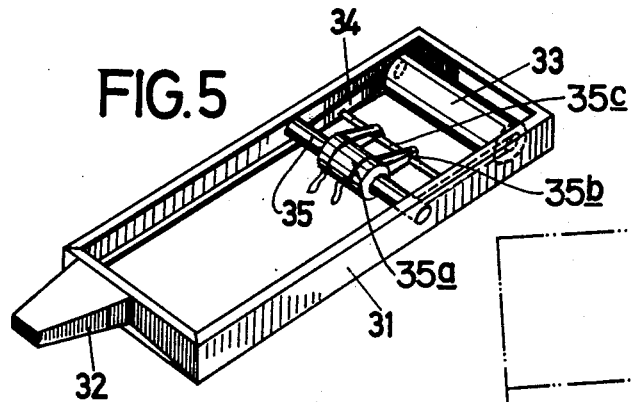
FIG. 5 shows a further modification of the trolley.
Figure 6:
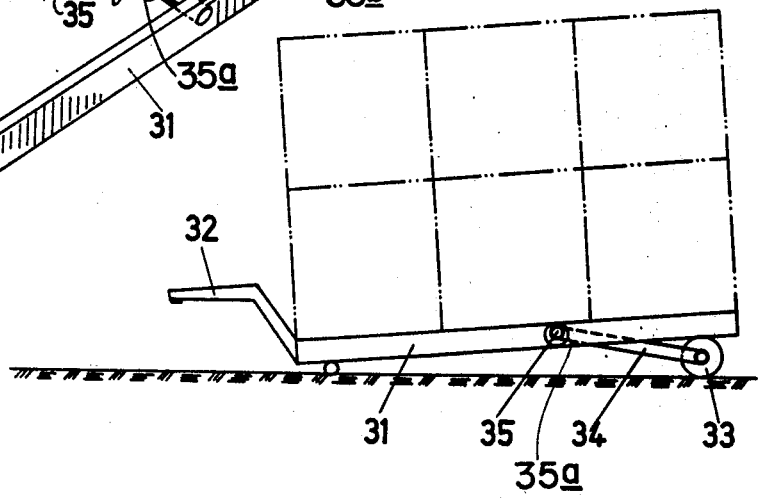
FIG. 6 shows an elevation of the latter during a moment of the movement, FIG. 7 schematically shows the arrangement of a bogie suitable for the embodiment according to FIG. 5, FIG. 8 schematically shows the arrangement of a bogie suitable for the embodiment according to FIG. 3, and FIGS. 9 and 10 show alternative embodiments of the beam frame.

On occasions, for instance when moving empty or lightly loaded containers, it is possible to use a frame of the type shown in FIGS. 5 and 6.

The trolley here consists of a frame 31, the dimensions of which permit the introduction into the channels formed by the beams of the frame. The trolley frame is at one end provided with a goose neck traction member 32 of known type, which may be lifted up and hitched to a traction vehicle. In the end of the trolley frame remote from the traction means a roller 33, or a series of wheels, are mounted upon a pair of arms 34, which are pivotable about a shaft 35 about midway in the trolley frame. The roller will carry the trolley frame when this is introduced into the beam frame. The shaft 35 is provided with a hydraulic rotary actuator 35a having lever means 35b which cooperate with the arms 34 via a cross bar 35c.

During a first moment of the operation the compound is brought into the position shown in FIG. 6. Thereafter the goose neck 32 is hitched to the traction vehicle whereby also the other end of the compound is lifted from ground level and is ready for transportation.

Figure 7:
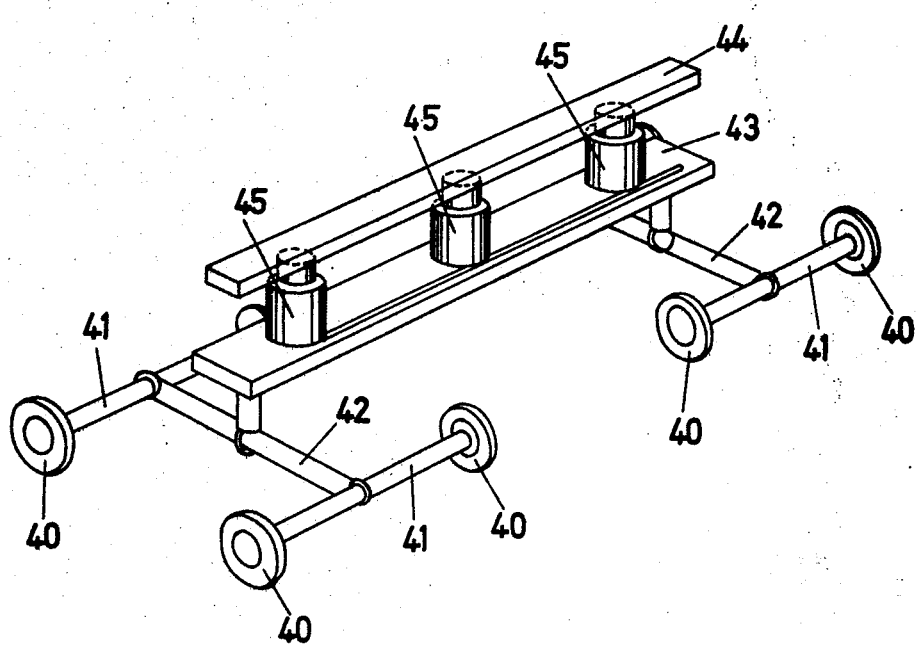

FIG. 7 shows more in detail, but still in a schematic way only, a bogie device adapted to substitute the roller 33 in FIGS. 5 and 6. The intention is that the bogie in the best possible manner shall move over possible irregularities in the ground.

The design includes two bogies each provided with four wheels 40, which are mounted in pairs upon axles 41. The axles are pivotably mounted with respect to a carrying beam 42, which in turn is pivotably connected to a transverse beam 43 interconnecting arms 34. Between transverse beam 43 and a further cross beam 44, forming part of trolley frame 31, a suitable number of pressure fluid rams 45 are mounted.

Figure 8:
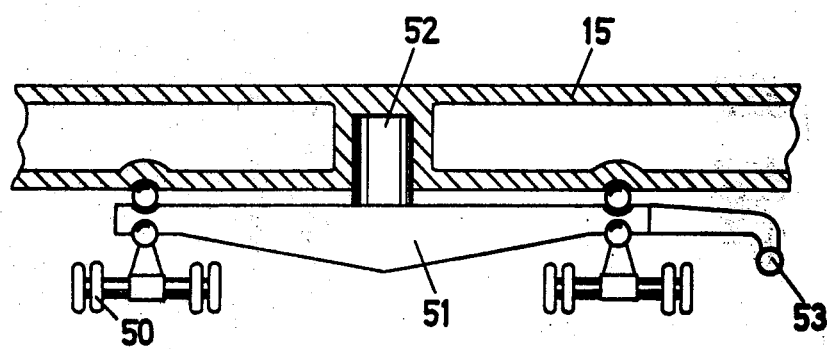

A similar bogie construction may also be used instead of roller 16 in FIG. 3. Such a bogie is schematically shown in FIG. 8.

Each bogie here includes four pair of wheels 50, which in the same manner as described in connection with the preceeding figure, are pivotably connected to a transverse beam. This is here formed as part of a disc 51, which may be turned about a centre pivot 52 being journalled in the main body of trolley 15. The disc engages the latter by way of a number of balls, which run in grooves and facilitate a turning of the bogie. In order to make possible a rational stowing of the big transportation compounds it may be necessary, as a last moment of a loading operation, to perform a sideward movement. By turning disc 51 it is possible to bring the bogie into various angular positions with respect to the longitudinal axis of the frame and thus to steer the compound. The disc 51 is to that end provided with a laterally extending arm 53, which may be connected to any suitable steering device.

It is of course also possible that it, on occasion, may be necessary to move the transport compound transversely to its longitudinal axis and it will then be necessary to form beam 51 as a full disc and to arrange the steering means, for instance in connection to pivot 52, in such a manner that the pivot may be made to turn substantially 90°.

Figure 9:
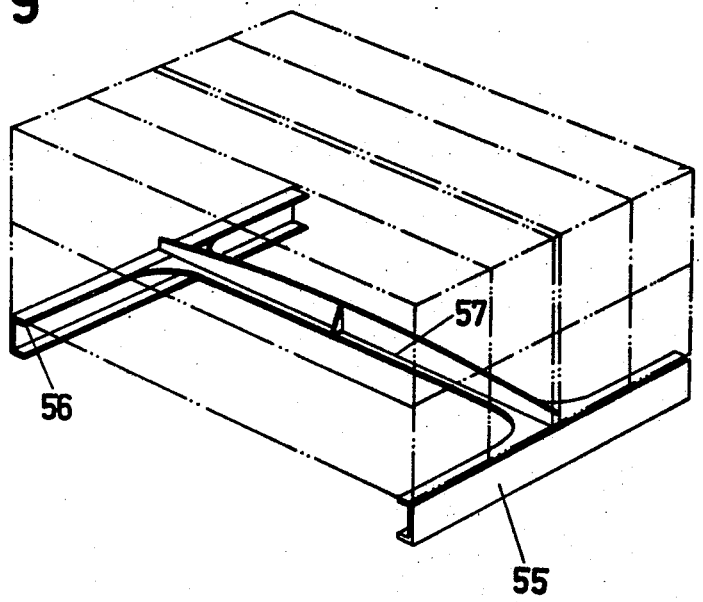
Figure 10:
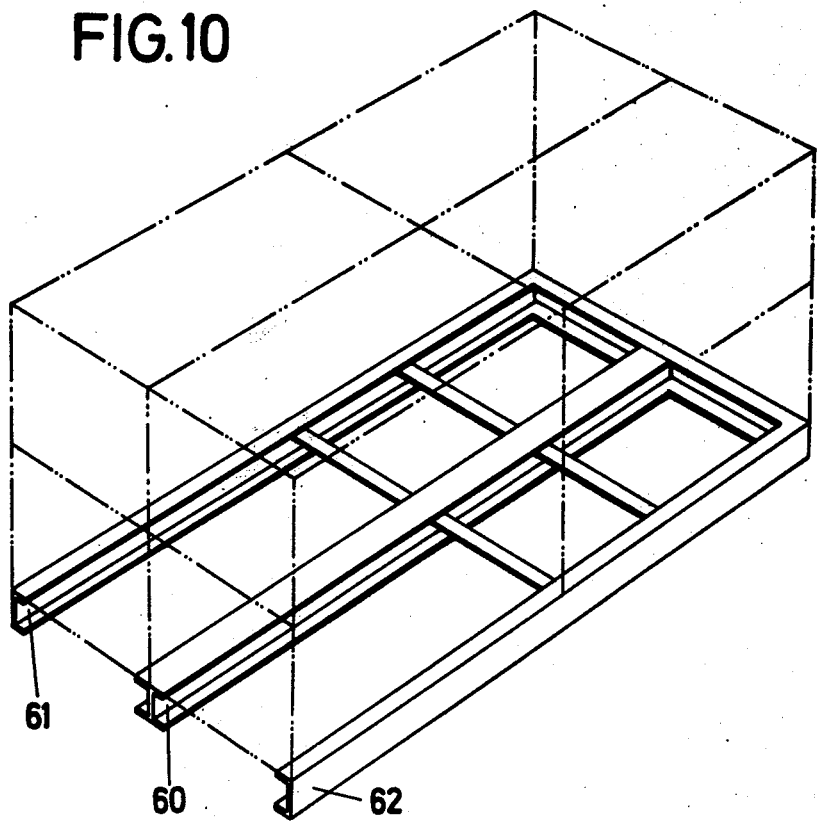

FIGS. 9 and 10 show some embodiments of composite frames. The one shown in FIG. 9 includes two channel formed side beams 55 and 56, which about midway are interconnected by a cross beam 57. This is, as in the cross beam 14 in the embodiment according to FIG. 1 not so deep as to prevent the introduction of a trolley member having the same length as the side beams.

This frame is adapted to receive four times two containers, and the frame may be served from two sides by means of fork lift trucks, as two sides of the frame are open.

The embodiment according to FIG. 10 may be regarded as two frames according to FIG. 1 arranged side by side. The intermediate beam 60 must here have an I-shaped cross section, while the outer beams 61 and 62 may be U- or I-beams. On this occasion the distance between the beams correspond to the breadth of a load unit, and the length of the side beams corresponds to the length of two load units. For the transportation two trolleys are required.

The devices above described and shown in the appended drawngs are examples of the invention only, the details of which may vary in many ways within the scope of the appended claims depending upon the size of the transport compound to be made up and upon the condition of the ground across which it has to be moved, i.e. the capacity of the ground locally to take care of heavy loads. The handling or the load units in relation to the frame has been described as performed by fork lift trucks, but it is evident that the handling may also be done by other known means. A container may for instance be handled by means of lifting tackle attached to its upper corner boxes.

What I claim is:

1. A device adapted to facilitate the simultaneous transportation of a number of standardized load units along a groundwork by means of a support and a trolley member adapted to be introduced into the support, the improvement that the support is formed as a beam frame of rectangular configuration, the breadth and length thereof substantially corresponding to whole multiples of the breadth and the length of a standardized load unit, and which is open at least along one of its sides, the beams forming the sides of the frame being arranged in such a manner that they will form a channel at least along two parallel sides of the frame, said channel being open inwards with respect to the frame, and the trolley member includes a platform of the same general size as the said frame having marginal portions adapted to fit into the channels along the said at least two sides of the beam frame, the trolley member being provided with means for facilitating the movement along the groundwork and further means to lift the frame and the load from the groundwork.

2. The device according to claim 1, in which the movement facilitating means includes a number of wheels or rollers and the lifting means includes a number of pressure fluid rams located along the said marginal portions of the platform.

3. The device according to claim 1, in which the platform includes a further frame provided with traction means for attachment to a vehicle, said traction means being adapted, when fitted to the vehicle, to lift the adjacent end of the load carrying frame, the said lifting and transportation facilitating means including a vertically displaceable group of wheels fitted at the said further frame, at the end thereof remote from the traction means.

4. The device according to claim 1, in which the said lifting and transportation facilitating means includes one or more air cushion devices adapted simultaneously to lift the frame and to make possible a horizontal movement.

5. The device according to claim 1, in which the frame, at a distance from its end opposite to the open side corresponding to the breadth of a load unit, is provided with a cross brace.

6. The device according to claim 1, in which the frame at its top side is provided with means adapted to engage the load units in order to prevent the latter from sliding off the frame.

7. The device according to claim 2, in which the trolley is carried by wheels grouped into at least two bogies, which are mounted so as to be dirigible with respect to the longitudinal axis of the frame.

8. The device according to claim 1, in which two frames, each having one side open, are interconnected to form a unit having basically the shape of an E.

9. The device accordng to claim 1, in which two frames are interconnected with their open sides facing in opposite directions, to form a unit having basically the shape of a H.

* * * * *